US010717851B2

(12) United States Patent
Kim et al.

(10) Patent No.: US 10,717,851 B2
(45) Date of Patent: Jul. 21, 2020

(54) LATEX COMPOSITION FOR DIP MOLDING, AND MOLDED PRODUCT MANUFACTURED THEREFROM

(71) Applicant: LG Chem, Ltd., Seoul (KR)

(72) Inventors: Hyunwoo Kim, Daejeon (KR); Seung Uk Yeu, Daejeon (KR); Yujin Cha, Daejeon (KR)

(73) Assignee: LG Chem, Ltd. (KR)

( * ) Notice: Subject to any disclaimer, the term of this patent is extended or adjusted under 35 U.S.C. 154(b) by 48 days.

(21) Appl. No.: 16/085,021

(22) PCT Filed: Aug. 23, 2017

(86) PCT No.: PCT/KR2017/009174
§ 371 (c)(1),
(2) Date: Sep. 14, 2018

(87) PCT Pub. No.: WO2018/048121
PCT Pub. Date: Mar. 15, 2018

(65) Prior Publication Data
US 2019/0085157 A1    Mar. 21, 2019

(30) Foreign Application Priority Data
Sep. 7, 2016 (KR) .................. 10-2016-0114799

(51) Int. Cl.
*C08L 9/04* (2006.01)
*C09D 5/02* (2006.01)
*A41D 19/00* (2006.01)
*C08J 5/02* (2006.01)
*C08L 9/00* (2006.01)
*B29C 41/14* (2006.01)
*B29K 33/20* (2006.01)
*B29L 31/48* (2006.01)

(52) U.S. Cl.
CPC .............. *C08L 9/04* (2013.01); *A41D 19/00* (2013.01); *C08J 5/02* (2013.01); *C08L 9/00* (2013.01); *C09D 5/02* (2013.01); *A41D 19/0062* (2013.01); *B29C 41/14* (2013.01); *B29K 2033/20* (2013.01); *B29L 2031/4864* (2013.01); *C08J 2309/04* (2013.01); *C08J 2433/12* (2013.01); *C08K 2201/003* (2013.01)

(58) Field of Classification Search
CPC ...... A41D 19/00; A41D 19/0062; C09D 5/02; C08L 9/04; C08L 9/00; C08J 5/02; C08J 2309/04; C08J 2433/12; B29K 2033/20; C08K 2201/003; B29C 41/14; B29L 2031/4864

USPC ........................................... 524/377
See application file for complete search history.

(56) References Cited

U.S. PATENT DOCUMENTS

| 4,510,204 | A | 4/1985 | Duke et al. |
| 10,023,728 | B2 * | 7/2018 | Cha ................. C08L 13/02 |
| 2010/0104789 | A1 | 4/2010 | Imada et al. |
| 2011/0229646 | A1 | 9/2011 | Kim et al. |
| 2014/0302265 | A1 | 10/2014 | Yang et al. |
| 2016/0194494 | A1 | 7/2016 | Foo et al. |
| 2017/0283599 | A1 | 10/2017 | Cha et al. |
| 2017/0298210 | A1 | 10/2017 | Joe et al. |

FOREIGN PATENT DOCUMENTS

| CN | 101652424 A | 2/2010 |
| JP | 2002226524 A | 8/2002 |
| JP | 2004285220 A | 10/2004 |
| JP | 3865054 B2 | 1/2007 |
| JP | 2009179687 A | 8/2009 |
| JP | 2014530289 A | 11/2014 |
| KR | 20100014936 A | 2/2010 |
| KR | 101126583 B1 | 3/2012 |
| KR | 20120083031 A | 7/2012 |
| KR | 101495392 B1 | 2/2015 |
| KR | 101582005 B1 | 12/2015 |
| KR | 20160046166 A | 4/2016 |
| KR | 20160076988 A | 7/2016 |
| WO | 2016064173 A1 | 4/2016 |
| WO | 2016093689 A1 | 6/2016 |
| WO | 2016105112 A1 | 6/2016 |

OTHER PUBLICATIONS

Search report from International Application No. PCT/KR2017/009174, dated Dec. 4, 2017.
Chinese Search Report for Application No. 201780025919.8, dated Jun. 2, 2020, pp. 1-2.

* cited by examiner

*Primary Examiner* — Angela C Scott
(74) *Attorney, Agent, or Firm* — Lerner, David, Littenberg, Krumholz & Mentlik, LLP

(57) ABSTRACT

The present invention relates to a latex composition for dip-molding comprising a mixture of latex pigment and carboxylic acid-modified nitrile based copolymer latex which are two types of latex having Tg different to each other, and a dip-molded article produced therefrom.
The dip-molded article according to the present invention does not use sulfur and a vulcanization accelerator and thus has a low risk of allergies and can have excellent elasticity, while maintaining the physical properties such as tensile strength and modulus in the trade-off relationship opposite to each other at the levels equal to or higher than those of the prior art, so that the dip-molded article can be easily applied to industries in need thereof, such as industry of rubber gloves, etc.

15 Claims, No Drawings

LATEX COMPOSITION FOR DIP MOLDING, AND MOLDED PRODUCT MANUFACTURED THEREFROM

CROSS-REFERENCE TO RELATED APPLICATIONS

The present application is a national phase entry under 35 U.S.C. § 371 of International Application No. PCT/KR2017/009174 filed Aug. 23, 2017, which claims priority from Korean Patent Application No. 10-2016-0114799, filed on Sept. 7, 2016, the entire contents of which are incorporated herein by reference.

TECHNICAL FIELD

The present invention relates to a latex composition for dip-molding which can be used to prepare a dip-molded article with excellent tensile strength and elasticity by including latex with a high glass transition temperature capable of film formation in latex compositions, and a molded article produced therefrom.

BACKGROUND ART

The rubber gloves which are used in a variety of field, such as housework, food industry, electronic industry, medical field have been made by molding natural rubber. However, in recent years, the natural rubber is limited in its use due to the problem of allergies of natural protein of natural rubber and its unstable supply and demand.

Therefore, rubber gloves made by dip-molding the latex composition produced by blending sulfur and a vulcanization accelerator to synthetic rubber latices without causing allergic reaction, such as a carboxylic acid-modified nitrile based copolymer latex of a acrylic acid-acrylonitrile-butadiene copolymer latex, etc., are widely used.

Rubber gloves made from these sulfur S and the vulcanization accelerators can have good durability and improved strength to the extent that rubber gloves do not break easily even if they are used for a long time, as the sulfur forms cross-linking between the polymer chains, However, rubber gloves prepared with carboxylic acid-modified nitrile-based copolymer latex have less elasticity than those prepared with natural rubber, and thus are limited for use in gloves where wearing sensation is important, such as surgical gloves.

Therefore, studies have been carried out to increase the content of AN or reduce the amount of acid used in carboxylic acid-modified nitrile-based copolymer latex. However, there is a problem that not only a large amount of coagulum is generated due to deterioration of the stability of the latex polymerization and thus stable polymerization is difficult, but also the rubber gloves prepared using the latex exhibit high modulus and thus the wearing sensation of the gloves is deteriorated. In addition, studies have been carried out to improve the elasticity by mixing latex with high glass transition temperature with carboxylic acid-modified nitrile based copolymer latex, but there is a great disadvantage that degradation of physical properties such as high modulus and low elongation compared to improvement of elasticity is generated.

In addition, when preparing the rubber gloves using sulfur and a vulcanization accelerator, it is required to carry out a long stirring and aging process for 24 hours or more, and thus there is a problem that the productivity is lowered. In addition, in the case of the rubber gloves formed by blending sulfur and the vulcanization accelerator as essential component, when wearing it for a long time and continuing work, unpleasant odor is generated due to sulfur, or discoloration of rubber gloves occurs, resulting in deterioration of the product value. Also, for some users, there is a problem that an allergic reaction is induced and skin irritation such as tingling is caused. Therefore, studies are underway to prepare rubber gloves with good durability without causing problems such as discomfort, discoloration, and allergic reactions in use, by not using sulfur and the vulcanization accelerator.

As an example, a rubber glove was studied that does not require a long stirring and aging process and does not cause discoloration by using latex composition for dip-molding including a conjugated diene rubber latex and organic peroxide. However, at this time, there are disadvantages that the solution of organic peroxide is very harmful to the human body and can cause fire and explosion when heat or impact is applied, and thus, process safety is very low.

In addition, a rubber glove that does not cause allergic reactions have been developed by sulfur and a vulcanization accelerator using a cross-linkable monomer along with an acrylic emulsion latex without the long stirring and aging process, but there is a problem that the physical properties are degraded by the timeelapes of the cross-linkable monomer.

As described above, it is very difficult to prepare a carboxylic acid-modified nitrile based latex which satisfies all of the above-mentioned characteristics opposite to each other in nitrile gloves of various fields, and there is a limit in preparing such a latex using the existing latex composition.

PATENT LITERATURE (Patent Document 1) Korean Laid-Open Patent Application No. 2016-0046155 (May 28, 2016), "Latex composition for dip-molding containing carboxylic acid-modified nitrile based copolymer latex and dip-molded article prepared therefrom"

(Patent Document 2) Japanese Laid-Open Patent Publication No. 2004-285220 (Oct. 14, 2004), "coating composition and dip-molded article"

DISCLOSURE

Technical Problem

Therefore, the present invention has been made to solve the above problems of the prior art, and it has been confirmed by the present invention that without requiring long stirring and aging processes due to not using sulfur and a vulcanization accelerators, it is possible to prepare dip-molded articles having excellent elasticity while maintaining the physical properties such as tensile strength and modulus in the trade-off relationship opposite to each other at the levels equal to or higher than those of the prior art.

Accordingly, the object of the present invention is to provide a latex composition for dip-molding comprising a latex pigment and a carboxylic acid-modified nitrile based copolymer latex.

In addition, another object of the present invention is to provide a dip-molded article having excellent physical properties prepared from the latex composition for dip-molding.

Technical Solution

In order to achieve the above object, the present invention provides a latex composition for dip-molding comprising, a) a latex pigment containing a modified nitrile based copolymer copolymerized from a conjugated diene-based monomer, an ethylenically unsaturated nitrile monomer and an ethylenically unsaturated monomer, a plasticizer and a reactive compound with a reactive group in the molecular structure; and b) a carboxylic acid-modified nitrile based copolymer latex copolymerized from a conjugated diene-based monomer, an ethylenically unsaturated nitrile monomer and an ethylenically unsaturated acid monomer.

At this time, it is characterized in that the latex pigment has a glass transition temperature of 30 to 80° C. and the carboxylic acid-modified nitrile based latex has a glass transition temperature of −40 to −15° C.

In addition, it is characterized in that the latex composition for dip-molding comprises a) the latex pigment and b) the carboxylic acid-modified nitrile based copolymer latex in a weight ratio of 5:95 to 50:50 by solid content.

Advantageous Effects

The latex composition for dip-molding according to the present invention can be used to prepare dip-molded articles having excellent physical properties by using the latex pigment containing the modified nitrile based copolymer, the plasticizer and the reactive compound without using sulfur and the vulcanization accelerator.

Particularly, the prepared dip-molded article has low risk of allergy to skin and has an advantage of excellent durability against perspiration with excellent elasticity, while maintaining the physical properties such as tensile strength and modulus in the trade-off relationship opposite to each other at the levels equal to or higher than those of the prior art.

Also, by not using sulfur and a vulcanization accelerator, the stirring process for a long time in the preparation process is excluded, and thus the shortening of the entire process time is induced and the occurrence of skin allergies in prepared dip-molded articles is essentially blocked.

The dip-molded article can be easily applied to industries in need thereof, such as inspection gloves, condoms, catheters, industrial gloves, household gloves and health care products.

BEST MODE

Hereinafter, the present invention will be explained in more detail to assist the understanding thereof.

It will be understood that words or terms used in the specification and claims shall not be interpreted as limited to the meaning defined in commonly used dictionaries, and that the words or terms should be interpreted as having a meaning and concept that are consistent with the technical idea of the invention, based on the principle that an inventor may properly define the meaning of the words or terms to best explain the invention.

The dip-molded articles such as rubber gloves require a variety of physical properties for their use. With regard to mechanical and physical properties among them, the tensile strength and elongation must be high, the modulus should be low, the durability against perspiration should be excellent in use in contact with human body. These physical properties are preferably achieved without the use of allergenic sulfur and the vulcanization accelerator, but control of these physical properties is not easy.

Therefore, in the present invention, the conventional carboxylic acid-modified nitrile based copolymer is not used alone but is used with latex pigments containing a modified nitrile based copolymer, and they are designed to have different glass transition temperatures wherein the modified nitrile based copolymer has a controlled mixing ratio with carboxylic acid-modified nitrile based copolymers. In addition, the latex composition for dip-molding is prepared without sulfur and the vulcanization accelerator and a dip-molded article is prepared by using this.

The glass transition temperature (hereinafter referred to as 'Tg') means the point at which the molecules in the latex are activated by the temperature and start to move, i.e., the point at which the latex changes into a state having elasticity before it changes from a solid phase to a liquid phase. At this time, the Tg depends on the chemical structure of the copolymer, and the composition and the molecular weight of the monomer, and these directly affects the processability and physical properties, etc., of the molded article. Typically, the carboxylic acid-modified nitrile based copolymers have a Tg below 0° C., specifically below −10° C., and in the present invention, the latex having a high Tg value can be mixed with the carboxylic acid-modified nitrile based copolymer to increase the tensile strength, modulus, elongation, and durability against perspiration of the dip-molded article.

(a) Latex Pigment

The term "latex pigment" referred to herein means a composition having a high glass transition temperature and capable of reactive film-forming.

The latex pigment has Tg of 30 to 80° C. which is very high Tg compared to the conventional carboxylic acid-modified nitrile based copolymer latex having Tg of less than 0° C., for example, of about −50 to −10° C., and thus the physical properties of dip-molded article prepared thereof can be improved. That is, when the Tg is 30° C. or higher, sufficient elasticity is exhibited, and when the Tg is 80° C. or lower, cracking of the dip-molded article does not occur.

In order to achieve a high level of Tg, the latex pigment according to the present invention includes a modified nitrile based copolymer copolymerized from a conjugated diene-based monomer, an ethylenically unsaturated nitrile monomer and an ethylenically unsaturated monomer, a plasticizer and a reactive compound with a reactive group in the molecular structure copolymerized with an ethylenically unsaturated monomer.

Plasticizer is added to the polymer to improve workability, flexibility and elasticity, and it prevents cracking of the dip-molded article and improves physical properties such as elasticity and oil resistance. There are various types of plasticizers available in the polymer processing field, but they should not affect the stability of the latex composition for dip-molding and should be excellently compatible with the copolymer latex for uniform mixing. Also, considering that the dip-molded article of the present invention is applied to gloves and the like to be worn on the human body, it is preferable to use environmentally friendly plasticizers from materials harmless to the human body that are not associated with environmental hormones or carcinogens, or vegetable raw materials that do not contain phthalates or heavy metals.

The plasticizers may include polymeric plasticizers, aromatic plasticizers, aliphatic plasticizers, epoxy plasticizers, and flame retardant plasticizers. Among them, the polymeric plasticizer and the aromatic plasticizer can be preferably used in the present invention.

The polymeric plasticizer may include polyalkylene adipates, polyalkylene sebacates, polyalkylene azelates, polyethylene glycol, polypropyleneglycol. Among them, polyethylene glycol (hereinafter referred to as "PEG") is preferable. The PEG is produced by the polycondensation of ethyleneglycol and has excellent solubility in water and compatibility with organic solvents and the like. By using the PEG, it is possible to increase the Tg of the latex pigment and increase the tensile strength by increasing the molecular weight of the dip-molded article finally resulted, and it is possible to increase the elongation of the dip-molded article and lower the modulus thereof.

The usable PEG is those having Tg in the vicinity of −40° C. and Mw of 200 to 1000 g/mol, preferably 300 to 800 g/mol, more preferably 400 to 600 g/mol. If the Mw is less than the above range, the detachment phenomenon of latex occurs and thus cracks in the dip-molded article occur. On the contrary, if the Mw is in excess of the above range, the stability of the latex polymerization is deteriorated. Therefore, the Mw is selected within the above range.

The aromatic plasticizer is preferably benzoate compounds, and it is known as an environmentally friendly plasticizer. The aromatic plasticizer is not limited to the specific composition in the present invention, and any aromatic plasticizer can be used as long as it a known plasticizer. Representatively, the benzoate-based compound may include at least one selected from 2-(2-(2-phenylcarbonyloxyethoxy)ethoxy)ethyl benzoate, glyceryl tribenzoate, trimethylolpropane tribenzoate, isononyl benzoate, 1-methyl-2-oxypropoxy)ethyl benzoate, 2,2,4-trimethyl-1,3-pentanediol dibenzoate, n-hexyl benzoate, trimethylolpropane tribenzoate.

Other environmentally friendly plasticizers may also be used together with the benzoate-based plasticizers described above. As an example, dioctyl terephthalate (DOTP) can be used as an environmentally friendly plasticizer.

The content of these plasticizers is controlled so that the latex stability of latex pigments is not deteriorated and physical properties are improved. Preferably, the plasticizer compound is used in a predetermined amount relative to the denatured nitrile based copolymer. Specifically, the plasticizer compound is used in an amount of 1 to 10 part by weight relative to 100 parts by weight of the monomer mixture of the modified nitrile based copolymer. If the content is less than the above range, the above-mentioned effect cannot be obtained. On the contrary, if it exceeds the above range, the stability of the latex polymerization is lowered. Therefore, the plasticizer compound is suitably used within the above-mentioned range.

The latex pigment of the present invention comprises a reactive compound together with the plasticizer.

As used herein, the term "reactive compound" means a compound having at least one functional group with high reactivity in a molecular structure wherein this functional group is vinyl, epoxy and glycidyl group which are easy to bond. These can be combined with each other or mixed with other compositions to enable the formation of a film.

As an example, the reactive compound may include poly(tetramethylene ether)glycol diglycidylether, 3-alkoxy (C12-C13)-2-hydroxypropyl (meth)acrylate, propylene glycol polybutylene glycol mono(meth)acrylate, glycidyl (meth)acrylate, a silane coupling agent represented by R—Si=$X_3$ or R—Si=R'—$X_3$ (wherein R is a vinyl group, an epoxy group or a glycidyl group, R' is a C1 to C5 alkyl group, and X is a C1 to C4 alkoxy group or a halogen group). At this time, the (meth)acrylate includes both acrylate and methacrylate. In addition, R' may be a methyl group, an ethyl group, a propyl group, an isopropyl group, a butyl group or a pentyl group, and X may be methoxy, ethoxy or Cl.

Especially, when the reactive compound of polymer type such as poly(tetramethylene ether)glycol diglycidylether compound is used, the latex stability and compatibility with the copolymer are excellent, and thus it is possible to prepare dip-molded articles with excellent physical properties. At this time, the polymer may have MW of 250 g/mol or more, and preferably 250 to 1000 g/mol. If the MW of the reactive compound is less than the above range, the film formation is not easy and the tactile feeling, wearing sensation and tensile strength of the finally prepared dip-molded article may be lowered.

The content of the reactive compound is controlled so that the latex stability of the latex pigment is not deteriorated and the film is easily formed. Preferably, the reactive compound is used in a predetermined amount relative to the denatured nitrile based copolymer. Specifically, the reactive compound is used in an amount of 0.1 to 5 parts by weight, preferably 0.5 to 3 parts by weight, relative to 100 parts by weight of the monomer mixture of the modified nitrile based copolymer. If the content is less than the above range, the above-mentioned effect cannot be obtained. On the contrary, if it exceeds the above range, the stability of the latex polymerization is lowered. Therefore, the reactive compound is used properly within the above range.

The latex pigment including the plasticizer and the reactive compound described above is added before, during or after the copolymerization of the modified nitrile based copolymer latex, and preferably is added to the reactor together with the addition of monomer during the copolymerization of the modified nitrile based copolymer.

The modified nitrile based copolymer constituting the latex pigment is prepared by copolymerization of the conjugated diene-based monomers, the ethylenically unsaturated nitrile monomers and the ethylenically unsaturated monomers, and is described in detail below.

First, the conjugated diene-based monomer is a monomer constituting the carboxylic acid-modified nitrile based copolymer according to the present invention. Specific examples thereof include at least one selected from the group consisting of 1,3-butadiene, 2,3-dimethyl-1,3-butadiene, 2-ethyl-1,3-butadiene, 1,3-pentadiene and isoprene. Among these, 1,3-butadiene and isoprene are preferable, and 1,3-butadiene is most preferably used.

The conjugated diene-based monomer can be included in an amount of from 5 to 30 wt. %, preferably from 7 to 20 wt. %, more preferably from 10 to 15 wt. %, based on the total weight of 100 wt. % of the total monomers constituting the carboxylic acid-modified nitrile-based copolymer. If the content is less than the above range, the dip-molded article becomes stiff and cracking can occur. On the contrary, if it exceeds the above range, sufficient improvement of the physical properties such as elasticity of the dip-molded article may not be exhibited As other monomer constituting the carboxylic acid-modified nitrile based copolymer according to the present invention, the ethylenically unsaturated nitrile monomer is at least one selected from the group consisting of acrylonitrile, methacrylonitrile, fumaronitrile, α-chloronitrile and α-cyanoethyl acrylonitrile. Among these, acrylonitrile and methacrylonitrile are preferable, and acrylonitrile is most preferably used.

The ethylenically unsaturated nitrile monomer can be included in an amount of 10 to 50 wt. %, preferably 15 to 45 wt. %, more preferably 20 to 40 wt. % based on the total weight of 100 wt. % of the monomers for preparation of the modified nitrile-based copolymer. If the content is less than the above range, the oil resistance of the dip-molded article deteriorates and the tensile strength decreases, On the contrary, if it exceeds the above range, the dip-molded article becomes stiff and the wearing sensation deteriorates The modified-nitrile based copolymer according to the present invention may further comprise other ethylenically unsaturated monomers copolymerizable with the ethylenically unsaturated nitrile monomer and the ethylenically unsaturated acid monomer.

The copolymerizable ethylenically unsaturated monomer may include at least one selected from the group consisting of vinyl aromatic monomers including styrene, alkyl styrene and vinyl naphthalene; fluoroalkyl vinyl ether including fluoroethyl vinyl ether; ethylenically unsaturated acrylic monomer including (meth)acrylate and methyl (meth) acrylate; ethylenically unsaturated amide monomer including (meth)acrylamide, N-methylol (meth)acrylamide, N, N-dimethylol (meth)acrylamide, N-methoxy methyl(meth)acrylamide and N-propoxy methyl(meth)acrylamide; non-conjugated diene monomer including vinyl pyridine, vinyl norbornene, dicyclopentadiene and 1,4-hexadiene; and ethylenically unsaturated carboxylic ester monomer including trifluroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth) acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate and dimethylamino ethyl(meth)acrylate. Methyl methacrylate is preferably used.

The ethylenically unsaturated monomer can be used in an amount of 40 to 80 wt. %, preferably 45 to 75 wt. %, more preferably 50 to 70 wt. % based on the total weight of 100 wt. % of the monomers for preparation of modified-nitrile based copolymer. If the content is less than the above range, the tensile strength is lowered. On the contrary, if the content exceeds the above range, the balance between the soft wearing sensation and the tensile strength does not fit well. Therefore, the content is properly selected within the above range.

The latex pigment comprising the composition as described above can be prepared by emulsion polymerization by adding the additives such as a emulsifier, a polymerization initiator, a molecular weight modifier and an activator to a reactant which includes the monomer including a conjugated diene-based monomer, an ethylenically unsaturated nitrile monomer and an ethylenically unsaturated monomer, a plasticizer and a reactive compound The emulsifier used in the emulsion polymerization is not particularly limited and may include those commonly known in the art, and for example, anionic surfactants, nonionic surfactants, cationic surfactants, amphoteric surfactants and fatty acid surfactants, etc., can be used as emulsifiers. Specifically, at least one anionic surfactant selected from the group consisting of alkylbenzene sulfonates, aliphatic sulfonates, sulfuric acid ester salts of higher alcohols, α-olefin sulfonates and alkyl ether sulfuric acid ester salts can be preferably used.

The amount of the emulsifier to be used is not particularly limited and may be suitably adjusted by those skilled in the art. For example, the emulsifier may be used in an amount of 0.3 part by weight to 10 parts by weight based on 100 parts by weight of the total monomer mixture. The emulsifier may preferably be used in an amount of 0.8 part by weight to 9 parts by weight, more preferably 1.0 part by weight to 6 parts by weight. When the amount of the emulsifier used is less than 0.3 part by weight, stability during emulsion polymerization may be deteriorated. When the emulsifier is used in an amount exceeding 10 parts by weight, it is not easy to prepare the dip-molded article from the latex composition for dip-molding containing the emulsifier-containing latex pigment because of the increased generation of bubbles during the emulsion polymerization.

The polymerization initiator is not particularly limited and may include those commonly known in the art, but a radical initiator can be used. The radical initiator may include at least one selected from the group consisting of inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile, azobis-2,4-dimethylvaleronitrile, azobiscyclohexanecarbonitrile and methyl azobisisobutyrate. Inorganic peroxides are preferable, and persulfates are particularly preferable.

The amount of the polymerization initiator used is not particularly limited and may be suitably adjusted by those skilled in the art. For example, the polymerization initiator is used in an amount of 0.01 to 2 parts by weight, preferably 0.02 to 1.5 parts by weight, based on 100 parts by weight of the monomer mixture. If the polymerization initiator is used in a amount of less than 0.01 part by weight, the polymerization rate is lowered and thus it is difficult to prepare the latex. On the contrary, if it is used in an amount of more than 2 parts by weight, the polymerization rate becomes too fast and it becomes difficult to control the degree of polymerization.

The molecular weight modifier is not particularly limited and may include those commonly known in the art. For example, the molecular weight modifier may include α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination of two or more. Mercaptans are preferable, and t-dodecyl mercaptan may be more preferable.

The amount of the molecular weight modifier used is not particularly limited and may be suitably adjusted by those skilled in the art. For example, the molecular weight modifier is used in an amount of 0.1 to 2 parts by weight, preferably 0.2 to 1.5 parts by weight, more preferably 0.3 to 1 part by weight based on 100 parts by weight of the monomer mixture. If the molecular weight modifier is used in a amount of less than 0.1 part by weight, the physical properties of the latex are deteriorated and thus the physical properties of the finally prepared dip-molded article may be deteriorated. If the molecular weight modifier is used in an amount of more than 2 parts by weight, the polymerization stability may be lowered The activating agent is not particularly limited and those ordinarily known in the art can be used. The examples thereof may include at least one selected from the group consisting of sodium formaldehyde sulfoxylate, sodium ethylenediamine tetraacetate, ferrous sulfate, dextrose, sodium pyrophosphate, and sodium sulfite.

During the polymerization, minor additives such as a chelating agent, a dispersing agent, a pH adjusting agent, a deoxidizing agent, a particle diameter adjusting agent, an anti-aging agent, and an oxygen scavenger may be also additionally contained as needed.

The emulsion polymerization is not particularly limited and can be carried out by a method commonly known in the art. A method in which the reactants including the reactive compound, the monomer mixture containing the conjugated diene-based monomer, the ethylenically unsaturated nitrile monomer and the ethylenically unsaturated acid monomer, and the additives to be contained in the latex pigment are fed all at once into the polymerization reactor, a method of continuously introducing the reactants, or a method in which a part of the reactants is charged at once and the remaining reactants are continuously introduced may be also used.

The polymerization temperature during the emulsion polymerization is not particularly limited, and may be generally from 10 to 90° C., preferably 25 to 75° C. In addition, the polymerization stopping point may be a time point when the polymerization conversion rate is 90% or more, preferably 93% or more. The emulsion polymerization may produce a latex pigment by removing the unreacted materials and adjusting the solid content and pH after the termination of polymerization.

The particle size of the prepared latex pigment through the emulsion polymerization may be 100 to 300 nm. If the particle diameter of the latex for dip-molding is within the above range, the tensile strength of the prepared dip-molded article can be improved. The particle diameter of the latex for dip-molding can be adjusted by controlling the kind or content of the emulsifier, and the particle diameter can be measured by laser (Laser Scattering Analyzer, Nicomp).

Also, the solid concentration of the latex pigment may be 10 to 40 wt. %, preferably 15 to 35 wt. %, more preferably 15 to 30 wt. %.

(b) Carboxylic Acid-Modified Nitrile Based Copolymer Latex

The latex composition for dip-molding according to the present invention comprises (a) a latex pigment and (b) a carboxylic acid-modified nitrile based copolymer.

The carboxylic acid-modified nitrile based copolymer is prepared by copolymerization of a conjugated diene-based monomer, an ethylenically unsaturated nitrile monomer and an ethylenically unsaturated acid monomer, wherein the Tg is in the range of −45 to −15° C. The carboxylic acid-modified nitrile based copolymer having Tg of the above range can be mixed with the latex pigment having the higher Tg than that of the carboxylic acid-modified nitrile based copolymer to produce a dip-molded article having excellent physical properties.

Specifically, the conjugated diene-based monomer may be of the type mentioned in the latex pigment (a), and the same or different kind as described in the latex pigment (a) may be used. The content of the conjugated diene-based monomer may be in the range of 40 to 89 wt. %, preferably 45 to 80 wt. %, more preferably 50 to 78 wt. %, based on the total monomer content of 100 wt. % for the preparation of carboxylic acid-modified nitrile based copolymers. If the content of the conjugated diene-based monomer is less than the above range, the dip-molded article prepared from the latex composition for dip molding that contains it may become stiff and the wearing sensation may be deteriorated. If the content exceeds 89 wt. %, the oil resistance of the dip-molded article prepared from the latex composition for dip-molding may be deteriorated and the tensile strength may be deteriorated.

Also, the ethylenically unsaturated nitrile monomer may be of the type mentioned in the latex pigment (a) above, and the same or different kind as described in the latex pigment (a) may be used. The content of the ethylenically unsaturated nitrile monomer may be 10 to 50 wt. %, preferably 15 to 45 wt. %, more preferably 20 to 40 wt. %, based on the total monomer content of 100 wt. % for preparation of the carboxylic acid-modified nitrile based copolymer. If the ethylenically unsaturated nitrile monomer is less than the above range, the oil resistance of the dip-molded article prepared from the latex composition for dip-molding containing the ethylenically unsaturated nitrile monomer may be deteriorated and the tensile strength may be lowered. If the content of the ethylenically unsaturated nitrile monomer exceeds 50 wt. %, the dip-molded article prepared from the latex composition for dip-molding that contains it may become stiff and the wearing sensation may be lowered. The ethylenically unsaturated nitrile monomer is the same as or those included in the ethylenically unsaturated nitrile monomer as described above in the latex pigment.

The ethylenically unsaturated acid monomer means an ethylenically unsaturated monomer containing at least one acidic group selected from the group consisting of carboxyl group, sulfonate group and acid anhydride group in the molecular structure. the ethylenically unsaturated acid monomer may be at least one selected from the group consisting of the ethylenically unsaturated carboxylic acid monomer such as acrylic acid, methacrylic acid, itaconic acid, maleic acid, or fumaric acid; polycarboxylic anhydrides such as maleic anhydride and citraconic anhydride; ethylenically unsaturated sulfonic acid monomers such as styrene sulfonate; ethylenically unsaturated polycarboxylic acid partial ester monomers such as monobutyl fumarate, monobutyl maleate and mono-2-hydroxypropyl maleate. Methacrylic acid is preferable. Also, the ethylenically unsaturated acid monomers can be used in the form of alkali metal salts or ammonium salts, etc.

The ethylenically unsaturated acid monomer can be included in an amount of 0.1 to 10 wt. %, preferably 0.5 to 9 wt. %, more preferably 1 to 8 wt. % based on the total weight of 100 wt. % of the monomers for preparation of the carboxylic acid-modified nitrile-based copolymer. If the ethylenically unsaturated acid monomer is included in an amount of less than 0.1 wt. %, the tensile strength of the dip-molded article prepared from latex composition for dip-molding that contains it may be lowered. If the ethylenically unsaturated acid monomer is included in an amount of more than 10 wt. %, the dip-molded article prepared from the latex composition for dip-molding that contains it may become stiff and the wearing sensation may be lowered.

In addition, the carboxylic acid-modified nitrile based copolymer latex may further contain 20 wt. % or less of the ethylenically unsaturated monomer, preferably 0.1 to 20 wt. %. The ethylenically unsaturated monomer may be the same as or those included in the ethylenically unsaturated monomer as described in the latex pigment.

Also, the carboxylic acid-modified nitrile based copolymer latex of the present invention can be prepared by the method as mentioned in latex pigment (a). The specific method is the same as mentioned in the above (a), and various conditions and additives for emulsion polymerization as set forth therein can be the same or can be appropriately controlled within the range mentioned above.

The particle size of the carboxylic acid-modified nitrile based copolymer latex of the present invention prepared through the above emulsion polymerization may be 100 to 200 nm. If the particle diameter of the latex for dip-molding is within the above range, the tensile strength of the prepared dip-molded article can be improved. The particle diameter of the latex for dip-molding can be adjusted by controlling the type and content of the emulsifier, and the particle diameter can be measured by laser (Laser Scattering Analyzer, Nicomp).

Also, the solid concentration of the latex pigment may be 10 to 40 wt. %, preferably 15 to 35 wt. %, more preferably 15 to 30 wt. %.

Latex Composition for Dip-Molding

The latex composition for dip-molding according to the present invention is prepared by mixing the above-mentioned latex pigment (a) and carboxylic acid-modified nitrile based copolymer latex (b).

At this time, the contents of the latex pigment and the carboxylic acid-modified nitrile based copolymer latex are defined in consideration of tensile strength, modulus, elongation, and durability against perspiration. Preferably, when calculated based on the content of solids, the latex pigment and the carboxylic acid-modified nitrile based copolymer latex are used in a weight ratio of 5:95 to 50:50, more preferably 7:93 to 30:70, most preferably 10:90 to 20:70. If the content of the latex pigment is less than the above range, the durability of the dip-molded article is lowered and the physical property of the elasticity are not improved. On the contrary, if the carboxylic acid-modified nitrile based copolymer latex is used in an amount of less than the above range, the elongation and durability of the prepared dip-molded article may be lowered. Therefore, the weight ratio can be appropriately controlled within the above range.

Mixing of these can be carried out by simple mixing, and if necessary, further includes stirring.

The prepared latex composition for dip-molding may further include various additives conventionally used in the preparation of dip-molded articles in this field, provided that since the latex composition for dip-molding of the present invention does not contain sulfur and the vulcanization additive, the composition is prepared while excluding them. The problem of allergy risk or productivity deterioration by long stirring and aging process over 24 hours which is occurred in the prior art is solved by excluding sulfur and the vulcanization additives As an example, the general additives, for example, ionic cross-linking agents such as metal oxides such as titanium oxide and zinc oxide, pigments, fillers, thickeners and pH adjusting agents such as ammonia or alkali hydroxides which can be used in the compositions for dip-molding are used for preparation of latex compositions for dip-molding.

The additives in the composition are preferably used in an amount of not more than 20 wt. % in the overall latex composition for dip-molding, more preferably 1 to 20 wt. %, more preferably 2 to 15 wt. %, To 3 to 12 wt. %.

In addition, the latex composition for dip-molding according to the present invention has a solid concentration of 5 to 40 wt. %, preferably 8 to 35 wt. %, more preferably 10 to 33 wt. %. If the concentration is too low, the transport efficiency of the latex composition will decrease. If it is too high, the solid concentration may cause an increase in viscosity, and it may cause problems such as storage stability and the like. Therefore, the concentration is appropriately adjusted within the above range.

The pH of the latex composition for dip-molding may be 8 to 12, preferably 9 to 11, more preferably 9.3 to 10.5. If the pH is out of the above range, stability of the latex composition for dip-molding may be deteriorated.

At this time, the pH of the latex composition for dip-molding can be adjusted by adding, when preparing the latex for dip-molding, a certain amount of a pH adjusting agent.

As the pH adjuster, 1 to 5% aqueous potassium hydroxide solution or 1 to 5% aqueous ammonia may be used.

Dip-Molded Article

In addition, the present invention provides a dip-molded article made from the latex composition for dip-molding.

The dip-molded article according to one embodiment of the present invention is not particularly limited and can be prepared by a method commonly known in the art, and for example, can be prepared by using a direct dipping method, an anode coagulation dipping method, a Teague's coagulation dipping method or the like. Preferably, the anode coagulation dipping method can be used. In the case of producing the dip-molded article using the anode coagulation dipping method, there is an advantage that the dip-molded article having a uniform thickness can be produced.

As a specific example, the dip-molded article can be prepared through steps comprising, immersing the hand-shaped mold for dip-molding in the coagulant solution and adhering the coagulant to the surface of the mold for dip-molding (step a);

immersing the dip-molding mold having the coagulant adhering to the surface thereof in the latex composition for dip-molding to form a dip-molding layer (step b); and heat-treating the dip-molding layer to cross-link the latex resin (step c).

Step (a) is a step for adhering a coagulant to the surface of the hand-shaped mold for dip-molding, and is not particularly limited, but may be carried out by dipping the mold for dip-molding in the coagulant solution for at least one minute and taking out the mold and then drying at 70 to 150° C.

The coagulant solution is a solution in which the coagulant is dissolved in water, an alcohol or a mixture thereof, and may generally contain 5 to 50 wt. % of coagulant, preferably 10 to 40 wt. % of coagulant.

The above-mentioned coagulant is not particularly limited, and for example include metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Calcium chloride, calcium nitrate and the combination thereof are preferred.

The step (b) is a step for forming the dip-molding layer of the latex composition for dip-molding according to the present invention on the mold for dip-molding in which the coagulant is adhered, and in the step (b), the dip-molding layer may be formed by immersing the coagulant-adhered mold for dip-molding in the latex composition for dip-molding for at least one minute and then taking out the mold.

The step (c) is a step for obtaining the dip-molded article by cross-linking the latex resin to the dip-molding layer and may be performed by heat-treating the dip-molding layer.

The heat-treating is not particularly limited, but may be performed by, for example, performing a first heat-treating at 70 to 150° C. for 1 minute to 10 minutes and then a second heat-treating at 100 to 180° C. for 5 minutes to 30 minutes.

During the heat-treating, the water component is first evaporated from the dip-molding layer, and the latex resin of the dip-molding layer is hardened through cross-linking, thereby obtaining the dip-molded article.

The dip-molded article is not particularly limited and may be applied to various latex industries, and for example, may be applied to at least one molded article selected from the group consisting of inspection gloves, condoms, catheters, industrial gloves, surgical gloves, household gloves, industrial gloves and health care products.

Hereinafter, preferred examples will be provided for better understanding of the present invention. It will be apparent to those skilled in the art that the following examples are only provided to illustrate the present invention, and various modifications and alternations are possible within the scope and technical range of the present invention. Such modifications and alternations are intended to fall within the scope of the appended claims.

EXAMPLES

Example 1: Preparation of Latex Composition for Dip-Molding and Dip-Molded Article (Latex Pigment Preparation)

A 10 L high-pressure reactor equipped with a stirrer, a thermometer, a condenser, and an inlet of nitrogen gas and configured to continuously feed a monomer, an emulsifier, and a polymerization initiator was replaced with nitrogen. Thereafter, to the high-pressure reactor, 0.9 part by weight of poly(tetramethylene ether)glycol diglycidyl ether, 2.5 parts by weight of sodium alkyl benzene sulfonate, 2.0 parts by weight of polyethylene glycol (MW: 400), 0.3 part by weight of t-dodecyl mercaptan and 140 parts by weight of ion-exchanged water, relative to 100 parts by weight of the monomer mixture of 25 wt. % of acrylonitrile, methyl methacrylate 60 wt. %, 1,4-butadiene 15 wt. %, were added and the temperature was raised to 40° C.

After raising the temperature, 0.25 parts by weight of potassium persulfate as a polymerization initiator was added. When the conversion rate reached 95%, the polymerization was stopped by adding 0.1 part by weight of sodium dimethyl dithiocarbamate. Unreacted monomers were removed through a deodorization process, and ammonia water, an antioxidant and a defoaming agent were added to obtain a latex pigment having a solid concentration of 45% and pH of 8.5.

The latex pigment was analyzed to have a glass transition temperature of 45° C. and a particle diameter of 130 nm.

(Preparation of Carboxylic Acid-Modified Nitrile Based Copolymer Latex)

A 10 L high-pressure reactor equipped with a stirrer, a thermometer, a condenser, and an inlet of nitrogen gas and configured to continuously feed a monomer, an emulsifier, and a polymerization initiator was replaced with nitrogen. Thereafter, to the high-pressure reactor, 2.5 parts by weight of sodium alkyl benzene sulfonate, 0.8 part by weight of t-dodecyl mercaptan and 140 parts by weight of ion-exchanged water, relative to 100 parts by weight of a monomer mixture of 30 wt. % of acrylonitrile, 65 wt. % of 1,4-butadiene, and 5.0 wt. % of methacrylic acid were added and the temperature was raised to 40° C.

After raising the temperature, 0.25 parts by weight of potassium persulfate as a polymerization initiator was added. When the conversion rate reached 95%, the polymerization was stopped by adding 0.1 part by weight of sodium dimethyl dithiocarbamate. Unreacted monomers were removed through a deodorization process, and ammonia water, an antioxidant and a defoaming agent were added to obtain a carboxylic acid-modified nitrile based copolymer latex having a solid concentration of 45% and pH of 8.5.

The carboxylic acid-modified nitrile based copolymer latex was analyzed to have a glass transition temperature of −30° C. and a particle diameter of 120 nm.

(Preparation of Latex Composition for Dip-Molding)

The prepared latex pigment and the carboxylic acid-modified nitrile based copolymer were mixed at a weight ratio of 5:95 as calculated on the basis of the solid content. To the obtained mixture, 2.0 parts by weight of 3% potassium hydroxide solution and 1.25% potassium hydroxide solution, an appropriate amount of distilled water, 1.0 part by weight of titanium oxide and 1.5 parts by weight of zinc oxide were added and mixed to prepare a latex composition for dip-molding with solid concentration of 15% and pH of 10.0. At this time, the amount expressed by part by weight is based on 100 parts by weight of the latex composition for dip-molding.

(Preparation of Dip-Molded Article)

The coagulant solution was prepared by mixing 12 parts by weight of calcium nitrate, 87.5 parts by weight of distilled water, and 0.5 parts by weight of a wetting agent (Teric 320 produced by Huntsman Corporation, Australia). A hand-shaped ceramic mold was immersed in this solution for 1 minute, taken out the mold and then dried at 80° C. for 3 minutes to coat the coagulant to the hand-shaped mold. Next, the mold coated with the coagulant was immersed in the composition for dip-molding for 1 minute, pulled up, dried at 100° C. for 3 minutes, and immersed in water or warm water for 3 minutes. Again, the mold was dried at 100° C. for 3 minutes and then cross-linked at 130° C. for 20 minutes. The cross-linked dip-molding layer was taken off from the hand mold to obtain a dip-molded article in the form of a glove, and the physical properties of the glove were measured.

Example 2: Preparation of Latex Composition for Dip-Molding and Dip-Molded Article A latex composition for dip-molding was prepared in the same manner as in Example 1 except that during the preparation of the latex composition for dip-molding, the latex pigment and the carboxylic acid-modified nitrile based copolymer latex are mixed in a weight ratio of 10:90, and using this, a glove-shaped dip-molded article was prepared.

Example 3: Preparation of Latex Composition for Dip-Molding and Dip-Molded Article A latex composition for dip-molding was prepared in the same manner as in Example 1 except that during the preparation of the latex composition for dip-molding, the latex pigment and the carboxylic acid-modified nitrile based copolymer latex are mixed in a weight ratio of 20:80, and using this, a glove-shaped dip-molded article was prepared.

Example 4: Preparation of Latex Composition for Dip-Molding and Dip-Molded Article A latex composition for dip-molding was prepared in the same manner as in Example 1 except that in the preparation of the latex pigment, 1.5 parts by weight of sodium alkylbenzene sulfonate and 0.20 part by weight of potassium persulfate are used, and using this, a glove-shaped dip-molded article was prepared. At this time, the prepared latex pigment was measured to have Tg of 43° C. and a particle diameter of 210 nm.

Example 5: Preparation of Latex Composition for Dip-Molding and Dip-Molded Article A glove-shaped dip-molded article was prepared in the same manner as in Example 2 above except that in the preparation of latex pigments, polyethylene glycol is not used during polymerization, and 2 parts by weight thereof is added after the completion of polymerization. At this time, the prepared latex pigment was measured to have Tg of 47° C. and a particle diameter of 126 nm.

Comparative Example 1: Preparation of Latex Composition for Dip-Molding and Dip-Molded Article A latex composition for dip-molding was prepared in the same manner as in Example 1 except that the carboxylic acid-modified nitrile based copolymer latex is used alone without the latex pigment, and using this, a glove-shaped dip-molded article was prepared.

Comparative Example 2: Preparation of Latex Composition for Dip-Molding and Dip-Molded Article A latex composition for dip-molding was prepared in the same manner as in Example 1 except that in preparing the composition for dip-molding, 1.5 parts by weight of sulfur and 0.7 part by weight of the vulcanization accelerator are added, and using this, a glove-shaped dip-molded article was prepared.

Comparative Example 3: Preparation of Latex Composition for Dip-Molding and Dip-Molded Article A latex composition for dip-molding was prepared in the same manner as in Example 2 except that the polyethylene glycol as the plasticizer is not used, and using this, a glove-shaped dip-molded article was prepared. At this time, the prepared latex pigment was measured to have Tg of 48° C. and a particle diameter of 125 nm.

Experimental Example 1: Evaluation of Physical Properties of Dip-Molded Article

The physical properties of the dip-molded articles prepared in the above Examples and Comparative Examples were measured.

(1) Tensile Strength, Elongation, and Modulus (MPa) at 300%

Dumbbell-shaped specimens were prepared from the obtained dip-molded article according to EN 455-2. Subsequently, the specimen was pulled at a stretch rate of 500 mm/min, and modulus at 300% elongation, tensile strength at break and elongation at break were measured.

At this time, it is judged that the higher the numerical values of the tensile strength and elongation, the better they are and the smaller the modulus, the better it is.

(2) Maintenance Rate of Tensile Strength

At the time when both ends of the dumbbell-shaped specimen were elongated from 20 mm to 40 mm of the standard section of the specimen at a speed of 500 mm/min, the elongation was stopped and the modulus M100 (0) was measured, and the modulus M100 (6) was measured after 6 minutes in that state.

The value of M100 (6) relative to M100 (0) is calculated as a percentage, and such value is defined as the maintenance rate of the modulus. At this time, it is judged that the larger the number, the better it is.

(3) Durability Against Perspiration

A solution for the determination of durability of the dip-molded article at 25° C. consisting of 16 parts by weight of sodium chloride, 16 parts by weight of lactic acid, 3.2 parts by weight of urea and 64.8 parts by weight of water was prepared. Thereafter, after placing the specimen of nitrile rubber gloves in a durability measuring device, the specimen was repeatedly stretched to twice the initial length (at most 2 times for stretching, at least 1 time for reducing), and the number of times until breakage was occurred. At this time, it is judged that the higher the number, the better the durability is

TABLE 1

| | Tensile strength (MPa) | Modulus at 300% (Mpa) | Elongation (%) | Maintenance rate of modulus(%) | Durability (number) |
|---|---|---|---|---|---|
| Example 1 | 27 | 5.8 | 565 | 33 | 722 |
| Example 2 | 30 | 5.5 | 581 | 37 | 870 |
| Example 3 | 34 | 6.3 | 532 | 42 | 937 |
| Example 4 | 31 | 5.1 | 593 | 40 | 865 |
| Example 5 | 27 | 6.4 | 535 | 32 | 713 |
| Comparative example 1 | 27 | 6.0 | 570 | 24 | 92 |
| Comparative example 2 | 28 | 7.5 | 527 | 30 | 875 |
| Comparative example 3 | 24 | 8.6 | 480 | 27 | 680 |

Referring to Table 1, it was confirmed that when preparing by using the latex composition for dip-molding containing the latex pigment according to the present invention, the tensile strength and modulus of the dip-molded article can be satisfied at the same time. The physical properties equal to or higher than those of Comparative Example 2 in which sulfur cross-linking was performed were exhibited. Also, as for the addition of the plasticizer, the physical properties of Examples 1 to 4 in which the plasticizer was added during the polymerization were more excellent than those in the case of adding the plasticizer after the polymerization.

In contrast, when comparing Comparative Example 1, in which the latex pigment was not used with Example 1, the tensile strength, modulus and elongation were similar, but experimental results of the maintenance rate of modulus and durability showed significant differences.

In addition, it can be seen that when the plasticizer was not used as in Comparative Example 3, the tensile strength, modulus, elongation and modulus characteristics were lower than those of Example 2, and the durability against perspiration was also significantly lowered.

The latex composition for dip-molding according to the present invention can be used for preparation of latex articles, for example, health care products such as various industrial and household gloves.

The invention claimed is:
1. A latex composition for dip-molding comprising
a) a latex pigment including a modified-nitrile based copolymer copolymerized from a conjugated diene-based monomer, an ethylenically unsaturated nitrile monomer and an ethylenically unsaturated monomer, plasticizer and a reactive compound with a reactive group in the molecular structure; and
b) a carboxylic acid-modified nitrile based copolymer latex copolymerized from a conjugated diene-based monomer, an ethylenically unsaturated nitrile monomer and an ethylenically unsaturated acid monomer,
wherein the modified-nitrile based copolymer is copolymerized from 5 to 30 wt.% of the conjugated diene-based monomer, 10 to 50 wt.% of ethylenically unsatu- rated nitrile monomer and 40 to 80 wt.% of ethylenically unsaturated monomer, based on a total of 100 wt.% of monomers.

2. The latex composition for dip-molding according to claim 1, wherein the latex pigment has a glass transition temperature of 30 to 80° C. and a particle diameter of 100 to 300 nm.

3. The latex composition for dip-molding according to claim 1, wherein the carboxylic acid-modified nitrile based copolymer latex has a glass transition temperature of -40 to -15° C. and a particle diameter of 100 to 200 nm.

4. The latex composition for dip-molding according to claim 1, wherein the latex composition for dip-molding includes a) the latex pigment and b) the carboxylic acid-modified nitrile based copolymer latex in a weight ratio of 5:95 to 50:50, as calculated as the solid content.

5. The latex composition for dip-molding according to claim 1, wherein the latex pigment includes 1 to 10 parts by weight of the plasticizer and 0.1 to 5 parts by weight of the reactive compound, relative to 100 parts by weight of the monomer mixture of the modified-nitrile based copolymer.

6. The latex composition for dip-molding according to claim 1, wherein the plasticizer is at least one selected from the group consisting of polyalkylene adipate, polyalkylene sebacate, polyalkylene azelate, polyethylene glycol, polypropylene glycol, 2-(2-(2-phenylcarbonyloxyethoxy)ethoxy)ethyl benzoate, glyceryl tribenzoate, trimethylolpropane tribenzoate, isononyl benzoate, 1-methyl-2-(2-phenylcarbonyloxypropoxy)ethyl benzoate, 2,2,4-trimethyl-1,3-pentanediol dibenzoate, n-hexyl benzoate, and dioctyl terephthalate.

7. The latex composition for dip-molding according to claim 1, wherein the reactive compound is a compound having at least one reactive group selected from the group consisting of a vinyl group, an epoxy group and a glycidyl group in the molecular structure.

8. The latex composition for dip-molding according to claim 1, wherein the reactive compound is at least one selected from the group consisting of poly(tetramethylene ether)glycol diglycidylether, 3-alkoxy(C12-C13)-2-hydroxypropyl (meth)acrylate, propylene glycol polybutylene glycol mono(meth)acrylate, glycidyl (meth)acrylate, and a silane coupling agent represented by $R-Si=X_3$ or $R-Si=R'-X_3$, wherein R is a vinyl group, an epoxy group or a glycidyl group, R' is a C1 to C5 alkyl group, and X is a C1 to C4 alkoxy group or a halogen group.

9. The latex composition for dip-molding according to claim 1, wherein the carboxylic acid-modified nitrile based copolymer is copolymerized from 40 to 89 wt.% of the conjugated diene-based monomer; 10 to 50 wt.% of the ethylenically unsaturated nitrile monomer; and 0.1 to 10 wt.% of the ethylenically unsaturated acid monomer, based on the total of 100 wt.% of the monomers.

10. The latex composition for dip-molding according to claim 1, wherein the conjugated diene-based monomer is at least one selected from the group consisting of 1,3-butadiene, 2,3-dimethyl-1,3-butadiene, 2-ethyl-1,3-butadiene, 1,3-pentadiene and isoprene.

11. The latex composition for dip-molding according to claim 1, wherein the ethylenically unsaturated nitrile monomer is at least one selected from the group consisting of acrylonitrile, methacrylonitrile, fumaronitrile, α-chloronitrile and α-cyanoethylacrylonitrile.

12. The latex composition for dip-molding according to claim 1, wherein the ethylenically unsaturated monomer is at least one selected from the group consisting of vinyl aromatic monomers including styrene, alkyl styrene and vinyl naphthalene; fluoroalkyl vinyl ether including fluoroethyl vinyl ether; ethylenically unsaturated acrylic monomer including (meth)acrylate and methyl (meth) acrylate; ethylenically unsaturated amide monomer including (meth)acrylamide, N-methylol (meth)acrylamide, N,N-dimethylol (meth)acrylamide, N-methoxy methyl(meth)acrylamide and N-propoxy methyl(meth)acrylamide; non-conjugated diene monomer including vinyl pyridine, vinyl norbornene, dicyclopentadiene and 1,4-hexadiene; and ethylenically unsaturated carboxylic ester monomer including trifluroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate and dimethylamino ethyl(meth)acrylate.

13. The latex composition for dip-molding according to claim 1, wherein the ethylenically unsaturated acid monomer is at least one selected from the group consisting of acrylic acid, methacrylic acid, itaconic acid, maleic acid, fumaric acid, maleic anhydride, citraconic anhydride, styrene sulfonate, monobutyl fumarate, monobutyl maleate and mono-2-hydroxypropyl maleate.

14. A dip-molded article prepared by dip-molding the latex composition for dip-molding according to claim 1.

15. The dip-molded article according to claim 14, wherein the dip-molded article is at least one selected from the group consisting of inspection gloves, condoms, catheters, industrial gloves, surgical gloves, household gloves, industrial gloves and health care products.

* * * * *